US007609047B2

(12) United States Patent
Ravichandran

(10) Patent No.: US 7,609,047 B2
(45) Date of Patent: Oct. 27, 2009

(54) DYNAMICALLY CONFIGURABLE VOLTAGE REGULATOR FOR INTEGRATED CIRCUITS

(75) Inventor: Krishnan Ravichandran, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 378 days.

(21) Appl. No.: 11/595,283

(22) Filed: Nov. 9, 2006

(65) Prior Publication Data

US 2008/0111534 A1 May 15, 2008

(51) Int. Cl.
*H02M 3/156* (2006.01)
(52) U.S. Cl. .................. 323/351; 323/277; 323/282
(58) Field of Classification Search ............. 315/209 R, 315/291; 323/277, 282–285, 249–251
See application file for complete search history.

(56) References Cited

U.S. PATENT DOCUMENTS 6,177,785 B1 * 1/2001 Lee ........................... 323/281
6,894,465 B2 * 5/2005 Sutardja et al. ............. 323/268
7,265,522 B2 * 9/2007 Sutardja et al. ............. 323/222
2005/0040800 A1 * 2/2005 Sutardja .................... 323/283
2005/0052163 A1 * 3/2005 Sutardja et al. ............. 323/222
2007/0035280 A1 * 2/2007 Fujiyama et al. ........... 323/212

* cited by examiner

*Primary Examiner*—David Hung Vu
*Assistant Examiner*—Tung X Le
(74) *Attorney, Agent, or Firm*—Kacvinsky LLC

(57) ABSTRACT

A voltage regulator architecture for an integrated circuit is described. An apparatus may comprise a power switch array having multiple pass transistors, a voltage regulator array having multiple voltage regulators each coupled to a subset of the pass transistors, a subsystem circuit array having multiple subsystem circuits each coupled to a subset of the pass transistors, and a power management control unit coupled to the pass transistors and the voltage regulators. The power management control unit may be arranged to control the pass transistors and voltage regulators to provide different amounts of power to the subsystem circuits. Other embodiments are described and claimed.

17 Claims, 2 Drawing Sheets

200

```
┌─────────────────────────────────────────────────┐
│ COUPLE VOLTAGE REGULATORS TO A POWER            │
│ SUBSYSTEM THROUGH A SET OF PASS TRANSISTORS     │
│ 202                                             │
└─────────────────────────────────────────────────┘
                        │
                        ▼
┌─────────────────────────────────────────────────┐
│ RECEIVE POWER AT A FIRST VOLTAGE LEVEL BY THE   │
│ VOLTAGE REGULATORS                              │
│ 204                                             │
└─────────────────────────────────────────────────┘
                        │
                        ▼
┌─────────────────────────────────────────────────┐
│ CONVERT THE POWER TO A SECOND VOLTAGE LEVEL     │
│ BY THE VOLTAGE REGULATORS                       │
│ 206                                             │
└─────────────────────────────────────────────────┘
                        │
                        ▼
┌─────────────────────────────────────────────────┐
│ PASS THE POWER AT THE SECOND VOLTAGE LEVEL TO A │
│ POWER SUBSYSTEM THROUGH THE PASS TRANSISTORS    │
│ 208                                             │
└─────────────────────────────────────────────────┘
```

FIG. 2

DYNAMICALLY CONFIGURABLE VOLTAGE REGULATOR FOR INTEGRATED CIRCUITS

BACKGROUND

With increased emphasis on digital mobility, there is continued pressure on reducing the form factor of portable electronic devices as well as strong end user desire for longer battery life. This has increased the value of techniques that save board area as well as reduce power consumption. One solution to conserve space and power consumption is in the area of power delivery technology. Voltage regulators are circuit elements that convert voltage levels from one level to another, such as converting a system voltage supply to a subsystem power supply. Voltage regulators, however, may consume significant amounts of board area as well as suffer power leaks. The latter problem in particular may require additional circuit elements, such as power gates, to shut down portions of a circuit while not in use thereby saving leakage power. Consequently, improvements in voltage regulators and voltage regulator architectures may solve these and other problems.

BRIEF DESCRIPTION OF THE DRAWINGS

FIG. 2 illustrates one embodiment of a logic flow.

DETAILED DESCRIPTION

Figure 1:
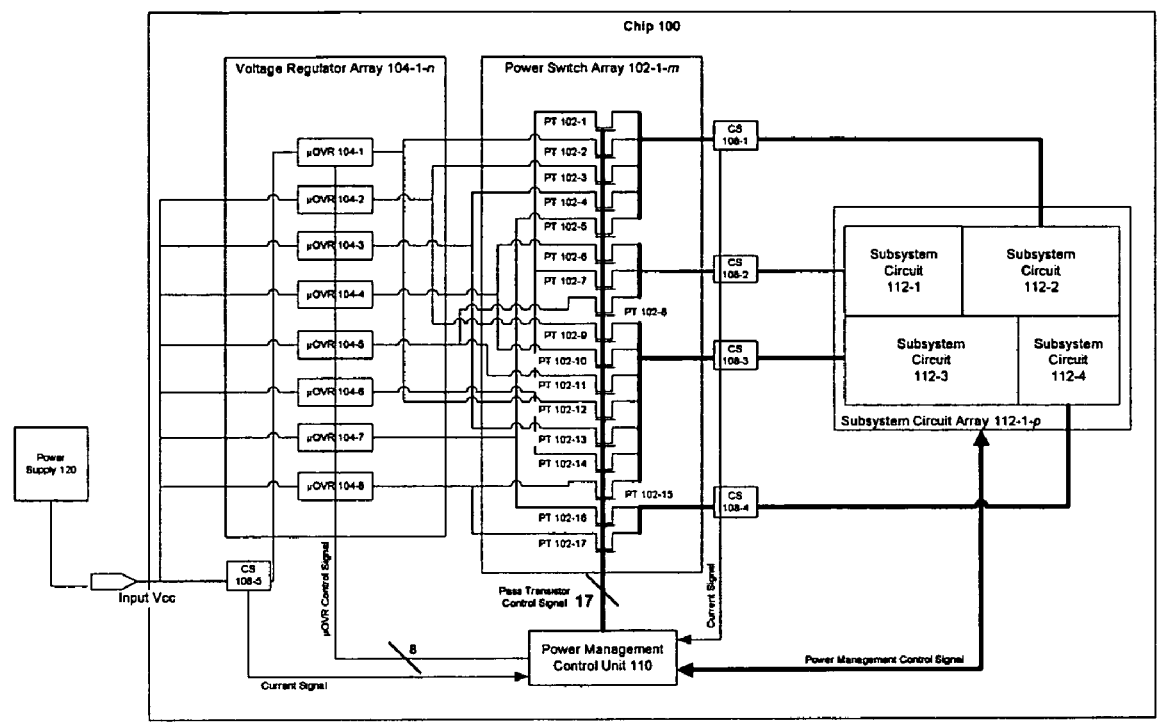
FIG. 1 illustrates one embodiment of an apparatus.

Various embodiments may be generally directed to power delivery techniques for electronic devices. Some embodiments may be particularly directed to a voltage regulator architecture for providing power to a circuit having multiple voltage domains. In one embodiment, for example, the circuit may include one or more circuit elements entirely implemented on a semiconductor substrate or semiconductor die, such as a monolithic integrated circuit (IC), also sometimes referred to as an IC, microchip, silicon chip, computer chip, and so forth (collectively referred to herein as a "chip"). In one embodiment, for example, the circuit may be implemented entirely on a complementary metal-oxide semiconductor (CMOS) or MOS IC. The embodiments, however, are not limited in this context.

FIG. 1 illustrates a block diagram of an apparatus 100. As shown in FIG. 1, apparatus 100 comprises multiple elements. In one embodiment, for example, apparatus 100 may comprise a chip having a power switch array 102 with multiple pass transistors 102-1-$m$, a voltage regulator array 104 with multiple voltage regulators 104-1-$n$ each coupled to a subset of the pass transistors 102-1-$m$, and a subsystem circuit array 112 having multiple subsystem circuits 112-1-$p$ each coupled to a subset of the pass transistors 102-1-$m$. Apparatus 100 may further include a power management control unit (PMCU) 110 coupled to pass transistors 102-1-$m$ and voltage regulators 104-1-$n$. Power management control unit 110 may be arranged to control pass transistors 102-1-$m$ and voltage regulators 104-1-$n$ to provide different or varying amounts of power to the subsystem circuits 112-1-$p$. In one embodiment, for example, apparatus 100 may be implemented on the same chip or semiconductor die. A main power supply 120 located off-chip from apparatus 100 may be coupled to voltage regulator array 104-1-$n$ to provide a voltage (Input_Vcc) power to the various subsystem circuits 112-1-$p$ located on-chip. In this manner, multiple subsystem circuits 112-1-$p$ having different power requirements may be coupled to main power supply 120, and apparatus 100 may be capable of dynamically varying the amount of power provided to each subsystem circuit 112-1-$p$ based on the maximum power requirements for each subsystem circuit 112-1-$p$ and the overall maximum power consumption of apparatus 100. Other embodiments are described and claimed.

In various embodiments, apparatus 100 may be arranged to provide several advantages over conventional power delivery solutions. For example, conventional power delivery solutions typically use voltage regulators implemented on the system board, one for each operating voltage level, with each voltage regulator designed to be able to deliver maximum power for a given operating voltage level. Since voltage regulator sizes are somewhat linear to the maximum load, however, the size for such voltage regulators increase as maximum load increases, therefore occupying more printed circuit board (PCB) area and increasing implementation costs. In another example, voltage regulators typically leak significant amounts of power. One solution is to insert a power gate at the power input for each subsystem circuit, thereby allowing the subsystem circuit to be shut down when not in use to save leakage power. This technique only addresses the average power consumption of the chip, however, and does not reduce the corresponding board area and power loss caused by the voltage regulators.

In one particularly promising solution, the voltage regulators may be implemented entirely on a CMOS IC, a technique sometimes referred to as an on-die voltage regulator (OVR). Each OVR would be designed to deliver the maximum current required by the load. The advantage of this approach is that it reduces the PCB area, and also reduces the overall power consumption of the system since the OVR can provide the functionality of power gates therefore saving leakage power. Similar to a PCB voltage regulator, however, the OVR sizing will also scale with the maximum load current. Therefore the voltage regulators for a given set of subsystem circuits would have to be designed to be capable of supplying up to a total sum of power for a given set of subsystem circuits.

Various embodiments may solve these and other problems. Apparatus 100 may represent or comprise a chip having miniaturized electronic circuit comprising mainly semiconductor devices, as well as passive components, which have been manufactured in the surface of a thin substrate of semiconductor material. In one embodiment, for example, power switch array 102, voltage regulator array 104, subsystem circuit array 112, and PMCU 110 are disposed on a single chip. Alternatively, apparatus 100 may comprise a hybrid integrated circuit such as a miniaturized electronic circuit constructed of individual semiconductor devices, as well as passive components, bonded to a substrate or circuit board. Although some embodiments may be described in terms of a voltage regulator architecture providing power to monolithic integrated circuits, the embodiments are not necessarily limited to this example.

In various embodiments, apparatus 100 may comprise an intelligent power switch array 102 having multiple pass transistors 102-1-$m$, with m representing any positive integer. Pass transistors 102-1-$m$ may comprise any suitable semiconductor circuit element arranged to control a flow of power passing from voltage regulators 104-1-$n$ to subsystem circuits 112-1-$p$. For example, when activated or enabled (high) pass transistors 102-1-$m$ may apply power to one or more subsystem circuits 112-1-$p$, and when deactivated or disabled (low) may remove power to one or more subsystem circuits 112-1-$p$.

In various embodiments, apparatus 100 may comprise voltage regulator array 104 having multiple micro on-die voltage regulators (μOVR) 104-1-$n$, with n representing any positive integer. In various embodiments, μOVR 104-1-$n$ may be coupled to one or more pass transistors 102-1-$m$ in accordance with varying topologies, as described in more detail below.

In general, a voltage regulator may refer to an electrical regulator designed to automatically maintain a constant voltage level. It may use passive or active electronic components. Depending on the design, it may be used to regulate one or more alternating (AC) or direct current (DC) voltages. A voltage regulator typically operates by comparing the actual output voltage to some internal fixed reference voltage. Any difference is amplified and used to control the regulation element. This forms a negative feedback servo control loop. If the output voltage is too low, the regulation element is commanded to produce a higher voltage. If the output voltage is too high, the regulation element is commanded to produce a lower voltage. In this way, the output voltage is held roughly constant. The control loop must be designed to produce the desired tradeoff between stability and speed of response.

In one embodiment, for example, one or more μOVR 104-1-$n$ may be configured to generate one or more voltage levels to deliver power to one or more subsystem circuits 112-1-$p$. In one embodiment, μOVR 104-1-$n$ may be coupled to main power supply 120 to receive power (Input_Vcc) at a first voltage level, and convert the power from the first voltage level to a second voltage level. For example, μOVR 104-1-$n$ may be configured to receive a system voltage supply (Input_Vcc) and convert the system voltage supply to a subsystem power supply (Subs_Vcc). In one embodiment, μOVR 104-1-$n$ may comprise a DC-to-DC converter, which may include, for example, certain converter topologies such as a Buck, boost and/or Buck/boost converter. In some embodiments, μOVR 104-1-$n$ may take a standard platform voltage (e.g. 1.8 volts) and generate an accurate configurable or operating voltage within a defined operating voltage range (e.g., 1.05 v, 1.3 v, 1.5 v, etc.) for use with subsystem circuits 112-1-$p$. For example, if Input_Vcc was 1.8 volts and a given subsystem circuit 112-1-$p$ required 1.05 volts, then μOVR 104-1-$n$ may regulate from 1.8 volts to 1.05 volts. μOVR 104-1-$n$ may be implemented in a variety of different arrangements, such as, for example a buck voltage regulator in an on-die semiconductor device (e.g., a MOS or CMOS configuration).

In various embodiments, apparatus 100 may comprise subsystem circuit array 112 having multiple subsystem circuits 112-1-$p$, with p representing any positive integer. Various subsystem circuits 112-1-$p$ may be coupled to one or more pass transistors 102-1-$m$ in various topologies. Subsystem circuits 112-1-$p$ may comprise any subsystem circuitry using power and arranged to perform at least one function of a larger system. For example, a subsystem circuit 112-1-$p$ may be configured to perform at least one function of a central processing unit (CPU), system on chip (SoC), chipset circuitry and/or other IC. For example, a subsystem circuit 112-1-$p$ may be configured to operate as a bus controller, floating point unit, display controller, audio controller, and so forth. Of course, these are only examples of the types of functions that may be performed by a subsystem circuit 112-1-$p$. Thus the term "subsystem circuit" as used in any embodiment herein, is intended to be construed broadly as including any subsystem of a system that is configured to perform at least one function of that system.

In various embodiments, two or more subsystem circuits 112-1-$p$ of subsystem circuit array 112 may have different voltage domains. By way of example only, apparatus 100 is shown as including four (4) subsystem circuits 112-1-4 all running at different voltage levels and consuming different levels of maximum power. Further, assume subsystem circuit 112-1 has a maximum operating power of 1 Watt (W), subsystem circuit 112-2 has a maximum operating power of 2 W, subsystem circuit 112-3 has a maximum operating power of 3 W, and subsystem circuit 112-4 has a maximum operating power of 0.5 W. Consequently, in this arrangement the maximum power consumed by apparatus 100 may comprise as much as approximately 6.5 W (1+2+3+0.5=6.5 W). In actual operation, however, the maximum power consumed by subsystem circuit array 112 is typically lower than the sum of the maximum of the individual subsystem circuits 112-1-4. For example, the maximum power consumed by subsystem circuit array 112 may be lower than 6.5 W since subsystem circuits 112-1-4 typically share various on-chip resources, such as I/O buffers, memory bandwidth, internal bus bandwidth, and so forth, and therefore cannot all be running at peak consumption simultaneously. Assuming a 90% maximum voltage regulator efficiency, which means that at a 4 W maximum load approximately 0.4 W is lost by μOVR 104-1-$n$, the total maximum power needed for subsystem circuit array 112 may comprise approximately 4.4 W.

In various embodiments, PMCU 110 may be arranged to output a voltage regulator control signal to control a given μOVR 104-1-$n$ to provide an output voltage at a defined voltage level within a defined voltage range. Referring again to the specific example given as apparatus 100 in FIG. 1, assume μOVR 104-1-$n$ may be identical or substantially similar voltage regulators each capable of supplying a peak value of y Watts integrated inside apparatus 100. For apparatus 100 as shown in FIG. 1, by way of example only, assume y is arranged to provide an output voltage of approximately 0.5 W. Each μOVR 104-1-$n$ may be capable of being dynamically programmed to change its output voltage to any specified value within a range. For example, if the input voltage (Input_Vcc) to μOVR 104-1-$n$ was approximately 1.8 v, the output voltage for μOVR 104-1-$n$ could be programmable from approximately 0.8 v to 1.5 v. The output voltage for a given μOVR 104-1-$n$ may be programmed via a voltage regulator control signal received from PMCU 110, for example.

As previously described, apparatus 100 may include multiple subsystem circuits 112-1-$p$, each requiring different voltage levels within the above range and different maximum power limits. These subsystem circuits 112-1-$p$ together form the overall chip load for apparatus 100. The maximum power consumed by the chip load for subsystem circuits 112-1-4 at any given time is somewhat less than the sum of all power requirements due to shared resources or system bottlenecks (e.g., bus bandwidth, pin limitations, and so forth) which prevent all the units from operating to their maximum limit simultaneously. The number of μOVR 104-1-$n$ for a given implementation may be determined by the maximum power for a given chip load. In the example shown in FIG. 1, the chip load has a 4 W maximum limit, and therefore eight (8) μOVR 104-1-8 may be used, with each μOVR 104-1-$n$ arranged to provide approximately 0.5 W (assuming 100% μOVR efficiency). The number of μOVR 104-1-$n$ and configured output voltages, however, may be varied for a given set of design and performance constraints as desired for a given implementation. The embodiments are not limited in this context.

As shown in FIG. 1, μOVR 104-1-8 are connected to subsystem circuits 112-1-4 via power switch array 112. Power switch array 112 may comprise multiple pass transistors 102-1-$m$ that are arranged to transfer the voltage from μOVR 104-1-8 to subsystem circuits 112-1-4. Each subsystem circuits 112-1-4 is connected to several pass gates 102-1-$m$ based on the amount of maximum power it could require. In one algorithm, for example, the number of pass transistors 102-1-*m* needed for each subsystem circuit 112-1-*p* is equal to one more than what is required to supply the maximum power for the subsystem circuit 112-1-*p*. For example, if subsystem circuit 112-2 has a maximum power requirement of 2 W, subsystem circuit 112-2 may be connected to five (5) pass transistors. As shown in FIG. 1, subsystem circuit 112-2 is coupled to pass transistors 102-1 through 102-5. Similarly, subsystem circuit 112-1 is coupled to three (3) pass transistors 102-6 through 102-8, subsystem circuit 112-3 is coupled to seven (7) pass transistors 102-9 through 102-15, and subsystem circuit 112-4 is coupled to two (2) pass transistors 102-16, 102-17.

All pass transistors 102-1-17 connected to a given subsystem circuit 112-1-4 are connected to different (unique) μOVR 104-1-8. This provides maximum flexibility for the multiplexing algorithm. For example, as shown in FIG. 1, the 5 pass transistors 102-1-5 for subsystem circuit 112-2 are connected to μOVR 104-1, 104-2, 104-3, 104-4, and 104-7; the 3 pass transistors 102-6-8 for subsystem circuit 112-1 are connected to μOVR 104-4, 104-5 and 104-6; the 7 pass transistors 102-9-15 for subsystem circuit 112-3 are connected to μOVR 104-1, 104-2, 104-3, 104-4, 104-5, 104-6 and 104-8; and finally the 2 pass transistors 102-16, 102-17 are connected to μOVR 104-7, 104-8. In one embodiment, the two pass transistors connecting to the same subsystem circuit 112-1-*p* should not be connected to the same μOVR 104-1-*n*. Rather, the connections should be unique, if possible.

Additional factors that can be considered in the mapping of μOVR 104-1-*n* include the probability of two units achieving peak at the same time. For example, if subsystem circuits 112-1, 112-2 could both peak at the same time, then they should not share any μOVR 104-1-*n*. In the example shown in FIG. 1, subsystem circuits 112-1, 112-2 share μOVR 104-4, and therefore the design assumes that powers subsystems 112-1, 112-2 will not likely peak at the same time. This constraint can be factored in during the design phase as the power consumption and workload (software application) profile of each subsystem circuit 112-1-*p* becomes known.

At any given point in time, only one pass transistor 102-1-*m* for each μOVR 104-1-8 is turned on. In the example given in FIG. 1, this would mean that of the 17 pass transistors 102-1-17, only 8 are on at any given time.

In various embodiments, PMCU 110 may be arranged to control pass transistors 102-1-*m* and voltage regulators 104-1-*n* to dynamically modify an amount of power provided to a given subsystem circuit 112-1-*p*. For example, PMCU 110 may output one or more pass transistor control signals to control one or more pass transistors 102-1-*m* to pass power from one or more of μOVRs 104-1-*n* to one or more of subsystem circuits 112-1-*p*. In this manner, the dynamic selection (on/off control) of pass transistors 102-1-*m* may be performed by PMCU 110. PMCU 110 drives the signals directly to each pass transistor 102-1-*m* to control them. In one embodiment, a direct connection of 17 wires between PMCU 110 to each of pass transistors 102-1-17 is sufficient for such control signaling.

In various embodiments, apparatus 100 may comprise multiple current sensors 108-1-*q*, with q representing any positive integer. In one embodiment, for example, a current sensor 108-5 may be disposed between a main power supply 120 and the μOVR 104-1-*n*. Further, multiple current sensors 108-1-4 may be disposed between pass transistors 102-1-*m* and subsystem circuits 112-1-*p*. Current sensors 108-1-5 may be arranged to provide output current values to PMCU 110. PMCU 110 may output a voltage regulator control signal and a pass transistor control signal to modify power to a subsystem circuit based on the output current values.

More particularly, current sensors 108-1-5 may each comprise a current (Ampere) sensing circuit inserted somewhere on the path for the power rail to each of subsystem circuits 112-1-*p*. Current sensors 108-1-5 may be implemented as any suitable current sensing circuit, such as a fixed linear resistor and an Analog-to-Digital (A/D) converter that translates the voltage across the resistor into a current (ampere) value. The information from current sensors 108-1-4 may be fed to PMCU 110. PMCU 110 may be implemented with an internal look-up table to translate the current to power for the various voltage ranges (P=V*I). The information from current sensor 108-5 located on the path (wire) feeding the Input_Vcc may also be fed to PMCU 110.

In one embodiment, current sensors 108-1-4 are inserted on the path of the power rails to each of subsystem circuit 112-1-4, and current sensor 108-5 is inserted on the path of the power rail from the main voltage input (Input_Vcc) to μOVR 104-1-8. The information from current sensors 108-1-5 is fed to PMCU 110, and PMCU 110 uses an internal look-up table to translate the current to power for the various voltage ranges (P=V*I). PMCU 110 utilizes the information from current sensors 108-1-5 to determine an optimal allocation of the μOVR 104-1-8 to subsystem circuits 112-1-4. At power-up, PMCU 110 may start by allocating μOVR 104-1-8 based on the specified ratios. A sample calculation is given by Equation (1) as follows:

$$VR_i = (SP_i/TP) * VR_{total} \qquad \text{Equation (1)}$$

where $VR_i$ represents a number of μOVR per subsystem circuit, $SP_i$ represents a maximum power for a subsystem circuit, TP represents a total power for all subsystem circuits, and $VR_{total}$ represents a total number of available μOVR. For example, a number of μOVR for subsystem circuit 112-2 may comprise 2 μOVR (e.g., 2 W/6.5 W*8=2 μOVR). Similar calculations would yield 1 μOVR for subsystem circuit 112-1, 1 μOVR for subsystem circuit 112-4, and 4 μOVR for subsystem circuit 112-3.

Consequently, PMCU 110 may be arranged to receive as input the current values, allocate a set of μOVR 104-1-*n* for each of subsystem circuits 112-1-*p*, and output control signals to activate the allocated set of μOVR 104-1-*n* and pass transistors 102-1-*m* coupled to the allocated set of μOVR 104-1-*n*.

When a current consumed by a given subsystem circuit 112-1-*p* approaches the capacity of the number of μOVR 104-1-*n* connected to it, PMCU 110 could dynamically add an additional μOVR 104-1-*n* to its path, and potentially drop it from another subsystem circuit 112-1-*p* connected to the added μOVR 104-1-*n*. In one embodiment, for example, the subsystem circuit 112-1-*p* donating the μOVR 104-1-*n* may be the subsystem circuit 112-1-*p* using the least of its allocated capacity.

A μOVR 104-1-*n* may be added or removed from a given path by first turning off the pass transistors 102-1-*m* that are connected to the target μOVR 104-1-*n*. In many cases, there should be only one pass transistor 102-1-*m* on at any given point in time. The target μOVR 104-1-*n* may be reprogrammed to the new target voltage, such as by PMCU 110. The pass transistor 102-1-*m* connecting the target μOVR 104-1-*n* to the target subsystem circuit 112-1-*p* may then be turned on.

In various embodiments, PMCU 110 also has ability to throttle the various subsystem circuit 112-1-*p* in apparatus 100 to lower the power consumption. This can be accomplished, for example, by slowing down the clock, lowering the voltage, or both, such as when performed using the Intel® Speedstep® technology. PMCU 110 may interface to subsystem circuits 112-1-*p* via an interface labeled "Power Management Control" as indicated in FIG. 1.

In some embodiments, PMCU 110 may be arranged to guarantee that apparatus 100 never exceeds the maximum defined or specified power consumption under virtually any scenario. In the example provided in FIG. 1, the maximum specified power consumption for subsystem circuit array 112 is assumed to be approximately 4 W based on design estimates. If there was an error in the estimates and apparatus 100 could actually consume more power, however, problems may occur in the form of potentially damaging the semiconductor die packaging or creating other reliability issues. PMCU 110 can be arranged to protect such power draws from happening. As the total current information from the Input_Vcc line provided by current sensor 108-5 approaches or reaches the 4 W limit, PMCU 110 can start throttling subsystem circuits 112-1-4 to ensure that the desired total is not exceeded.

In other embodiments, PMCU 110 can also be arranged to guarantee a defined or specified average power consumption for apparatus 100. For example, if a battery was low and the user wanted to reduce or limit power consumption to a smaller number (e.g., 1 W total), then PMCU 110 can monitor the total current information from current sensors 108-1-5 and ensure that it never exceeds the desired total (e.g., 1 W). PMCU 110 can accomplish this by, for example, throttling the subsystem circuit 112-1-*p* that is consuming the largest power at that time.

Operations for apparatus 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using any desired hardware elements, software elements, or combination of both.

FIG. 2 illustrates a logic flow 200. Logic flow 200 may be representative of the operations executed by one or more embodiments described herein. As shown in FIG. 2, logic flow 200 may couple voltage regulators (104) to a subsystem circuit through a set of pass transistors (102) at block 202. Logic flow 200 may receive power at a first voltage level by the voltage regulators (104) at block 204. Logic flow 200 may convert the power to a second voltage level by the voltage regulators (104) at block 206. Logic flow 200 may pass the power at the second voltage level to a subsystem circuit (112) through the pass transistors (102) at block 208. The embodiments are not limited in this context.

In one embodiment, for example, an additional voltage regulator (104) may be coupled to the subsystem circuit (112) through another pass transistor (102) to provide more power to the subsystem circuit (112). The embodiments are not limited in this context.

In one embodiment, for example, a voltage regulator (104) may be decoupled from the subsystem circuit (112) through one of the pass transistors (102) to provide less power to the subsystem circuit (112). The embodiments are not limited in this context.

In one embodiment, for example, a current level may be sensed (108). The voltage regulators (104) and the pass transistors (102) may be selected based on the current level. The embodiments are not limited in this context.

In one embodiment, for example, an output voltage level for a voltage regulator (104) may be modified (110) to provide more power to the subsystem circuit (112). The embodiments are not limited in this context.

Various embodiments may provide several advantages relative to conventional power delivery solutions. For example, some embodiments may be used to precisely control the power consumption of a chip to a target value using a reduced or minimum number of voltage regulators. In another example, some embodiments may reduce the overall die area and power. This can be particularly beneficial to ensure certain battery life and thermal characteristics. Other advantages may be achieved as well.

Some embodiments, such as apparatus 100, may be implemented as a part, component or sub-system of an electronic device. Examples of electronic devices may include, without limitation, a processing system, computer, server, work station, appliance, terminal, personal computer, laptop, ultra-laptop, handheld computer, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

Some embodiments, such as apparatus 100, may be implemented as part of a communication system. A communication system may comprise multiple logic devices arranged to communicate information or data to each other. When implemented as a wireless communication system, one or more logic devices may include various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of radio-frequency (RF) spectrum, for example. When implemented as a wired communication system, one or more logic devices may include various elements suitable for wired communications, such as one or more input/output (I/O) adapters, physical connectors to connect the I/O adapter with a corresponding wired communications medium, communication interfaces, network interface card (NIC), and other wired elements. Examples of wired communications media may include wire, cable, metal leads, printed circuit board (PCB), backplane, switch fabric, semiconductor material, twisted-pair wire, co-axial cable, fiber optics, and so forth. The embodiments are not limited in this context.

Various embodiments may comprise one or more elements. An element may comprise any feature, characteristic, structure or operation described in connection with an embodiment. Examples of elements may include hardware elements, software elements, physical elements, or any combination thereof. Although an embodiment may be described with a limited number of elements in a certain arrangement by way of example, the embodiment may include more or less elements in alternate arrangements as desired for a given implementation. It is worthy to note that any references to "one embodiment" or "an embodiment" are not necessarily referring to the same embodiment.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   a power switch array having multiple pass transistors;
   a voltage regulator array having multiple voltage regulators each coupled to a subset of said pass transistors;
   a subsystem array having multiple subsystem circuits each coupled to a subset of said pass transistors; and
   a power management control unit coupled to said pass transistors and said voltage regulators, said power management control unit to control said pass transistors and voltage regulators to provide different amounts of power to said subsystem circuits and to output a voltage regulator control signal to control a voltage regulator to provide an output voltage at a defined voltage level within a defined voltage range.

2. The apparatus of claim 1, said power switch array, voltage regulator array, subsystem circuit array, and power management control unit disposed on a single chip.

3. The apparatus of claim 1, said voltage regulators coupled to a main power supply to receive power at a first voltage level, and convert said power from said first voltage level to a second voltage level.

4. The apparatus of claim 1, said power management control unit to control said pass transistors and voltage regulators to dynamically modify an amount of power provided to a subsystem circuit.

5. The apparatus of claim 1, said power management control unit to output a pass transistor control signal to control a pass transistor to pass power from one of said voltage regulator to one of said subsystem circuits.

6. The apparatus of claim 1, said power management control unit to output a voltage regulator control signal and a pass transistor control signal to control power from a voltage regulator through a pass transistor to a subsystem circuit.

7. The apparatus of claim 1, said power management control unit to output a voltage regulator control signal and a pass transistor control signal to control an amount of power from multiple voltage regulators through multiple pass transistors to a subsystem circuit based on an operating voltage level for said subsystem circuit.

8. The apparatus of claim 1, comprising a current sensor disposed between a main power supply and said voltage regulators, and multiple current sensors disposed between said pass transistors and said subsystem circuits, said current sensors providing output current values to said power management control unit, said power management control to output a voltage regulator control signal and a pass transistor control signal to modify power to a subsystem circuit based on said output current values.

9. The apparatus of claim 1, comprising:
   a current sensor disposed between a main power supply and said voltage regulators, said current sensor to output a current value;
   multiple current sensors disposed between said subset of pass transistors and said subsystem circuits, said current sensors to output current values; and
   said power management control unit to receive as input said current values, allocate a set of voltage regulators for each of said subsystem circuits, and output control signals to activate said allocated set of voltage regulators and pass transistors coupled to said allocated set of voltage regulators.

10. A system, comprising:
    a power switch away having multiple pass transistors;
    a voltage regulator array having multiple voltage regulators each coupled to a subset of said pass transistors;
    a subsystem circuit array having multiple subsystem circuits each coupled to a subset of said pass transistors;
    a power management control unit coupled to said pass transistors and said voltage regulators, said power management control unit to control said pass transistors and voltage regulators to provide different amounts of power to said subsystem circuits;
    a main power supply to couple to said voltage regulator array; and
    a current sensor disposed between the main power supply and said voltage regulators, and multiple current sensors disposed between said pass transistors and said subsystem circuits, said current sensors providing output current values to said power management control unit, said power management control to output a voltage regulator control signal and a pass transistor control signal to modify power to a subsystem circuit based on said output current values.

11. The apparatus of claim 10, said power switch array, voltage regulator array and subsystem circuit away disposed upon a single die.

12. The apparatus of claim 10, said power management control unit to control said pass transistors and voltage regulators to dynamically modify an amount of power provided to a subsystem circuit.

13. The apparatus of claim 10, said power management control unit to output voltage regulator control signals and pass transistor control signals to control an amount of power from multiple voltage regulators through multiple pass transistors to a subsystem circuit based on an operating voltage level for said subsystem circuit.

14. A method, comprising
coupling voltage regulators to a subsystem circuit through a set of pass transistors;
receiving power at a first voltage level by said voltage regulators;
converting said power to a second voltage level by said voltage regulators;
passing said power at said second voltage level to the subsystem circuit through said pass transistors;
sensing a current level; and
selecting said voltage regulators and said pass transistors based on said current level.

15. The method of claim 14, comprising coupling an additional voltage regulator to said subsystem circuit through another pass transistor to provide more power to said subsystem circuit.

16. The method of claim 14, comprising decoupling a voltage regulator from said subsystem circuit through one of said pass transistors to provide less power to said subsystem circuit.

17. The method of claim 14, comprising modifying an output voltage level for a voltage regulator to provide more power to said subsystem circuit.

* * * * *

UNITED STATES PATENT AND TRADEMARK OFFICE
CERTIFICATE OF CORRECTION

| | | |
|---|---|---|
| PATENT NO. | : 7,609,047 B2 | Page 1 of 1 |
| APPLICATION NO. | : 11/595283 | |
| DATED | : October 27, 2009 | |
| INVENTOR(S) | : Krishnan Ravichandran | |

It is certified that error appears in the above-identified patent and that said Letters Patent is hereby corrected as shown below:

In column 10, line(s) 17–18, in Claim 5, delete "regulator" and insert -- regulators --, therefor.

In column 10, line 24, in Claim 7, after "unit to output" delete "a".

In column 10, line 24, in Claim 7, delete "signal and a" and insert -- signals and --, therefor.

In column 10, line 25, in Claim 7, delete "signal" and insert -- signals --, therefor.

In column 10, line 52, in Claim 10, delete "away" and insert -- array --, therefor.

In column 11, line 7, in Claim 11, delete "away" and insert -- array --, therefor.

Signed and Sealed this

Fifth Day of January, 2010

David J. Kappos
*Director of the United States Patent and Trademark Office*